(12) United States Patent
Srinivasan (10) Patent No.: US 9,679,037 B2
(45) Date of Patent: Jun. 13, 2017

(54) SYSTEM AND METHOD FOR IMPLEMENTING DATABASE REPLICATION CONFIGURATIONS USING REPLICATION MODELING AND TRANSFORMATION

(71) Applicant: Wipro Limited, Bangalore (IN)

(72) Inventor: Velmurugan Srinivasan, Chennai (IN)

(73) Assignee: WIPRO LIMITED, Bangalore (IN)

( * ) Notice: Subject to any disclaimer, the term of this patent is extended or adjusted under 35 U.S.C. 154(b) by 330 days.

(21) Appl. No.: 13/959,792

(22) Filed: Aug. 6, 2013

(65) Prior Publication Data

US 2014/0365437 A1    Dec. 11, 2014

(30) Foreign Application Priority Data

Jun. 7, 2013 (IN) .......................... 2497/CHE/2013

(51) Int. Cl.
    G06F 17/30    (2006.01)
(52) U.S. Cl.
    CPC .. G06F 17/30575 (2013.01); G06F 17/30289 (2013.01); *G06F 17/30002* (2013.01)
(58) Field of Classification Search
    CPC ......... G06F 17/30286; G06F 17/30289; G06F 17/30002; G06F 17/30578; G06F 17/30575
    USPC ....................................................... 707/635
    See application file for complete search history.

(56) References Cited

U.S. PATENT DOCUMENTS

| | | | | |
|---|---|---|---|---|
| 5,806,074 A | * | 9/1998 | Souder | G06F 17/30348 |
| 6,393,434 B1 | * | 5/2002 | Huang | G06F 17/30575 |
| 7,401,104 B2 | * | 7/2008 | Shah | G06F 17/30575 |
| | | | | 707/620 |
| 7,814,459 B2 | * | 10/2010 | Behnen | G06F 17/30569 |
| | | | | 707/602 |
| 8,346,788 B1 | * | 1/2013 | Kim et al. | 707/756 |
| 2003/0172368 A1 | * | 9/2003 | Alumbaugh et al. | 717/106 |
| 2006/0212543 A1 | * | 9/2006 | O'Farrell | G06F 8/20 |
| | | | | 709/219 |

(Continued)

OTHER PUBLICATIONS

"Understanding Active-Passive, Active/Active load balancing" by davidquaid. Published Jan. 31, 2013. Accessed Jul. 6, 2015. <http://loadbalancerblog.com/blog/2013/01/understanding-active-passive-activeactive-load-balancing>.*

*Primary Examiner* — Robert Beausoliel, Jr.
*Assistant Examiner* — Arthur Ganger
(74) *Attorney, Agent, or Firm* — Finnegan, Henderson, Farabow, Garrett & Dunner, LLP (57) ABSTRACT

A reverse engineering database replication data system is disclosed. In one embodiment, the replication data system receives an input of replication configuration data for a plurality of databases and builds memory models based on metadata accessed from the plurality of databases, which are then transformed to a first platform-specific replication model. Then, based on the first platform-specific replication model, a first universal replication model is configured, which is used to create a replication visual model using the rendering canvas. A user may modify the first universal replication model using the replication visual model to create a second universal replication model, which is then transformed to a second platform-specific replication model. Finally, scripts are generated for the second platform-specific replication model, which are then provided to a memory device.

21 Claims, 7 Drawing Sheets

(56) References Cited

U.S. PATENT DOCUMENTS

| | | | |
|---|---|---|---|
| 2008/0189439 A1* | 8/2008 | Chitre | H04L 67/1095 709/248 |
| 2010/0198787 A1* | 8/2010 | Robertson et al. | 707/634 |
| 2011/0252124 A1 | 10/2011 | Bonner et al. | |
| 2011/0320406 A1* | 12/2011 | Howell et al. | 707/634 |
| 2014/0250071 A1* | 9/2014 | Zhu | G06F 17/30575 707/634 |

* cited by examiner

SYSTEM AND METHOD FOR IMPLEMENTING DATABASE REPLICATION CONFIGURATIONS USING REPLICATION MODELING AND TRANSFORMATION

TECHNICAL FIELD

Embodiments of the present disclosure generally relate to databases, and more specifically to methods and systems for database replication modeling and transformation.

BACKGROUND

Databases are an integral part of Information Technology (IT) infrastructure. Business-critical IT systems must offer the highest availability, ensure fast and easy access to data, and adapt quickly to changing business demands. Many large organizations have responded to this need by migrating to an IT infrastructure that features a number of replicated databases, each positioned to respond rapidly to customer needs. The existence of a network of replicated databases, however, has focused attention on the process of database replication. Disaster Recovery (DR), High Availability (HA), Business Intelligence (BI), and even regulatory oversight require that database replication proceed seamlessly and continuously.

Increasingly, the demands of ever-increasing system availability as well as system complexity, call for evermore powerful solutions. To provide these solutions, active-active database configurations are increasingly employed. However, existing techniques of modeling active-active configurations, as well as other configurations, may not be sufficiently capable of addressing the granular details of the replication environment.

Thus, a need remains for modeling techniques that allow database managers and technicians to construct operational models of database replication systems across multiple network systems, operating environments, and database technologies.

SUMMARY

According to an exemplary embodiment, a method for reverse engineering database replication configuration data performed by at least one processor connected to a plurality of databases is provided. The method may include receiving, using the at least one processor, an input of replication configuration data for a plurality of databases; building, using the at least one processor, at least one memory model based on metadata accessed from the plurality of databases; transforming, using the at least one processor and based on the replication configuration data, the at least one memory model to a first platform-specific replication model, the first platform-specific replication model being configured for a first platform; and generating, using the at least one processor and based on the first platform-specific replication model, a first universal replication model configured for a plurality of platforms, the first universal replication model including a rendering canvas configured to receive at least one user-identified modification of the first universal replication model. The method may further include creating, using the at least one processor and based on the first universal replication model, a replication visual model using the rendering canvas, the replication visual model including configurable target and source properties; modifying, using the at least one processor, a property of the first universal replication model using the replication visual model to create a second universal replication model; transforming, using the at least one processor, the second universal replication model to a second platform-specific replication model, the second platform-specific replication model being configured for a second platform; generating, using the at least one processor, at least one script based on the second platform-specific replication model; and providing, using the at least one processor, the at least one script to a memory device.

According to another exemplary embodiment, a system for reverse engineering database replication configuration data is provided that comprises at least one processor connected to a plurality of databases and a memory device operatively connected to the at least one processor and storing processor-executable instructions. The instructions include receiving, using the at least one processor, an input of replication configuration data for a plurality of databases; building, using the at least one processor, at least one memory model based on metadata accessed from the plurality of databases; transforming, using the at least one processor and based on the replication configuration data, the at least one memory model to a first platform-specific replication model, the first platform-specific replication model being configured for a first platform; and generating, using the at least one processor and based on the first platform-specific replication model, a first universal replication model configured for a plurality of platforms, the first universal replication model including a rendering canvas configured to receive at least one user-identified modification of the first universal replication model. The instructions further include creating, using the at least one processor and based on the first universal replication model, a replication visual model using the rendering canvas, the replication visual model including configurable target and source properties; modifying, using the at least one processor, a property of the first universal replication model using the replication visual model to create a second universal replication model; transforming, using the at least one processor, the second universal replication model to a second platform-specific replication model, the second platform-specific replication model being configured for a second platform; generating, using the at least one processor, at least one script based on the second platform-specific replication model; and providing, using the at least one processor, the at least one script to a second memory device.

According to another exemplary embodiment a non-transitory computer-readable storage medium containing instructions to configure at least one processor connected to a plurality of databases to perform a method for reverse engineering database replication configuration data is provided. The method comprises receiving, using the at least one processor, an input of replication configuration data for a plurality of databases; building, using the at least one processor, at least one memory model based on metadata accessed from the plurality of databases; transforming, using the at least one processor and based on the replication configuration data, the at least one memory model to a first platform-specific replication model, the first platform-specific replication model being configured for a first platform; and generating, using the at least one processor and based on the first platform-specific replication model, a first universal replication model configured for a plurality of platforms, the first universal replication model including a rendering canvas configured to receive at least one user-identified modification of the first universal replication model. The method further comprises creating, using the at least one processor and based on the first universal replication model, a replication visual model using the rendering canvas, the replication visual model including configurable target and source properties; modifying, using the at least one processor, a property of the first universal replication model using the replication visual model to create a second universal replication model; transforming, using the at least one processor, the second universal replication model to a second platform-specific replication model, the second platform-specific replication model being configured for a second platform; generating, using the at least one processor, at least one script based on the second platform-specific replication model; and providing, using the at least one processor, the at least one script to a memory device.

While the disclosed embodiments may be amenable to various modifications and alternative forms, specific embodiments are shown by way of example in the drawings and are described in detail. It should be understood, however, that the drawings and detailed description thereto are not intended to limit the disclosed embodiments to the particular form disclosed, but on the contrary, the intention is to cover all modifications, equivalents, and alternatives falling within the spirit and scope of the disclosed embodiments as defined by the appended claims.

DETAILED DESCRIPTION

In the following description, numerous specific details are set forth to provide a thorough understanding of the present disclosure. However, it will be clear to one skilled in the art that the present disclosure may be practiced without some or all of these details. In other instances, well known process steps have not been described in detail in order to avoid unnecessarily obscuring the present disclosure.

Consistent with disclosed embodiments, database replication may involve the distribution of information across a series of database servers, which may be located either in the same location or scattered across the globe. Generally consisting of heterogeneous databases and operating systems, the disclosed embodiments provide support for bidirectional replication without being limited by physical location, transactional integrity, and reliable data delivery. Replication systems also provide fast recovery after interruptions.

Databases may be either collocated or spread across several data centers. Replication of these databases may be performed with a number of system architecture configurations. Example configurations may include one-to-one (source to target) replication, as well as one-to-many (one source to many targets), many-to-one (hub and spoke), cascading, bi-directional (active-active), and bi-directional (active-passive) replication. Active-active systems describe systems in which a first database sends data that has been changed in the first database to a second database to update the second database with the changed data.

Database operations can proceed in two directions. The first includes modeling database replication configurations, and then using those models to generate replication scripts. The second includes reverse engineering existing replication configurations, and then depicting these configurations visually to enable modification of the configurations.

Figure 1:
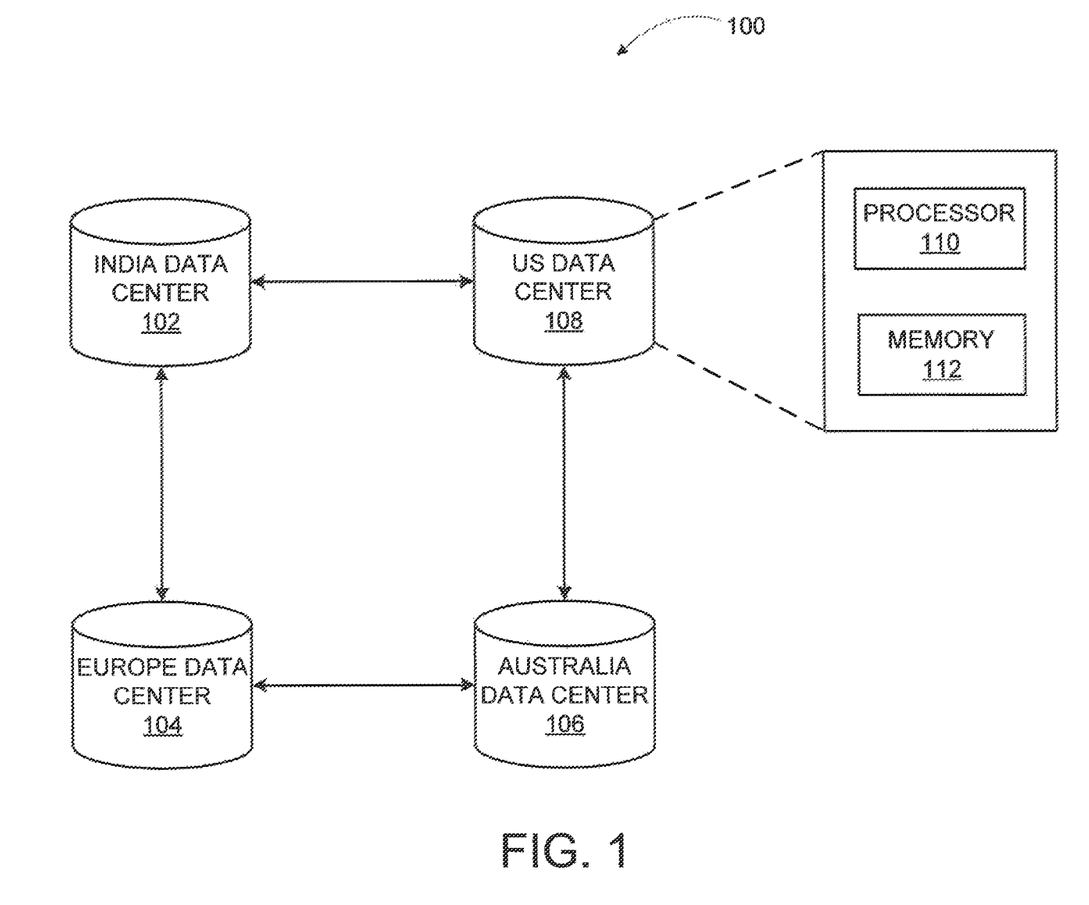
FIG. 1 is a block diagram of an exemplary environment consistent with the disclosed embodiments.

FIG. 1 illustrates an exemplary system 100 according to exemplary embodiments of the present disclosure. System 100 may include a plurality of data centers, such as India data center 102, Europe data center, 104, Australia data center 106, and United States (U.S.) Data Center 108. FIG. 1 illustrates U.S. data center 108 including processor 110 and memory 112. Each data center 104, 106, and 108 may also include or be operably connected to a processor and a memory, such as processor 110 and memory 112. Memory 112 may be operably connected to processor 110. Memory 112 may store instructions, such as computer-executable instructions, for processing data from the one or more data centers as described below in further detail. The memory 112 may be a non-transitory computer-readable storage medium, in the form of, for example, Random Access Memory (RAM) or other suitable memory structures.

System 100 may relate to an Information Technology (IT) platform for an online airline ticket booking service where users across the world may access the ticket booking service through a website. Accordingly, the IT platform must deliver immediate access to the tremendous amount of airline data to users located across the world. Thus, the IT platform may include servers or data centers located at different locations around the world, such as data center 102 located in India, data center 104 located in Europe, data center 106 located in Australia, and data center 108 located in the United States (U.S.). Each data center may include several databases that store required data, such as available flights, booked tickets, user information, and the like. The databases within the various data centers may also be transactionally interconnected.

Continuing with the above example, after a user located in the United States books a ticket for a flight 'A,' data corresponding to this transaction, such as flight number, seat number, and the like, may be generated and stored in a database in U.S. data center 108. At the same time the U.S. user is booking the flight, additional users located in Europe, India and Australia may also be booking tickets for the same flight 'A'. To prevent the users from booking the same seat, for example, the databases located in data centers 102, 104, 106, and 108 must reflect the same information, such as information corresponding to occupied and unoccupied seats. Accordingly, system 100 may use database replication to ensure that the databases in each data center contain the same information. As such, when data is changed in one database, the change may be simultaneously implemented in the other database.

Further, the system 100 may provide replication modeling equipped with advanced active-active features such as conflict handlers. Conflict handling is an important component in database replication systems. A conflict may be likely to occur in a bi-directional environment, such as when the same row or field is being independently changed or updated in two different databases located in different data centers. When one of the changes may be replicated to another database, a conflict may occur. For example, in the airline ticket booking scenario discussed above, the same seat in a flight may be booked by two different persons located in different locations, and thus each accessing a different data center. When one database replicates with the seat information corresponding to one customer, and the other database replicates with the seat information corresponding to another customer, a conflict may occur. The conflict may be resolved with conflict handlers. For example, the conflict may be resolved based on rules. A rule may require, for example, that data from Site B, such as a data center, may overwrite data on Site A, such as a different data center, based on a priority parameter associated with a user, a database, data center, or other parameter. Alternatively, a rule may require that both of the above transactions fail, and have no replication occur. Conflict handlers may be implemented or modeled in a universal replication model using the drawing canvas.

System 100 may be part of, include, or otherwise use system 700, which will be further described below with respect to FIG. 7.

Figure 2:
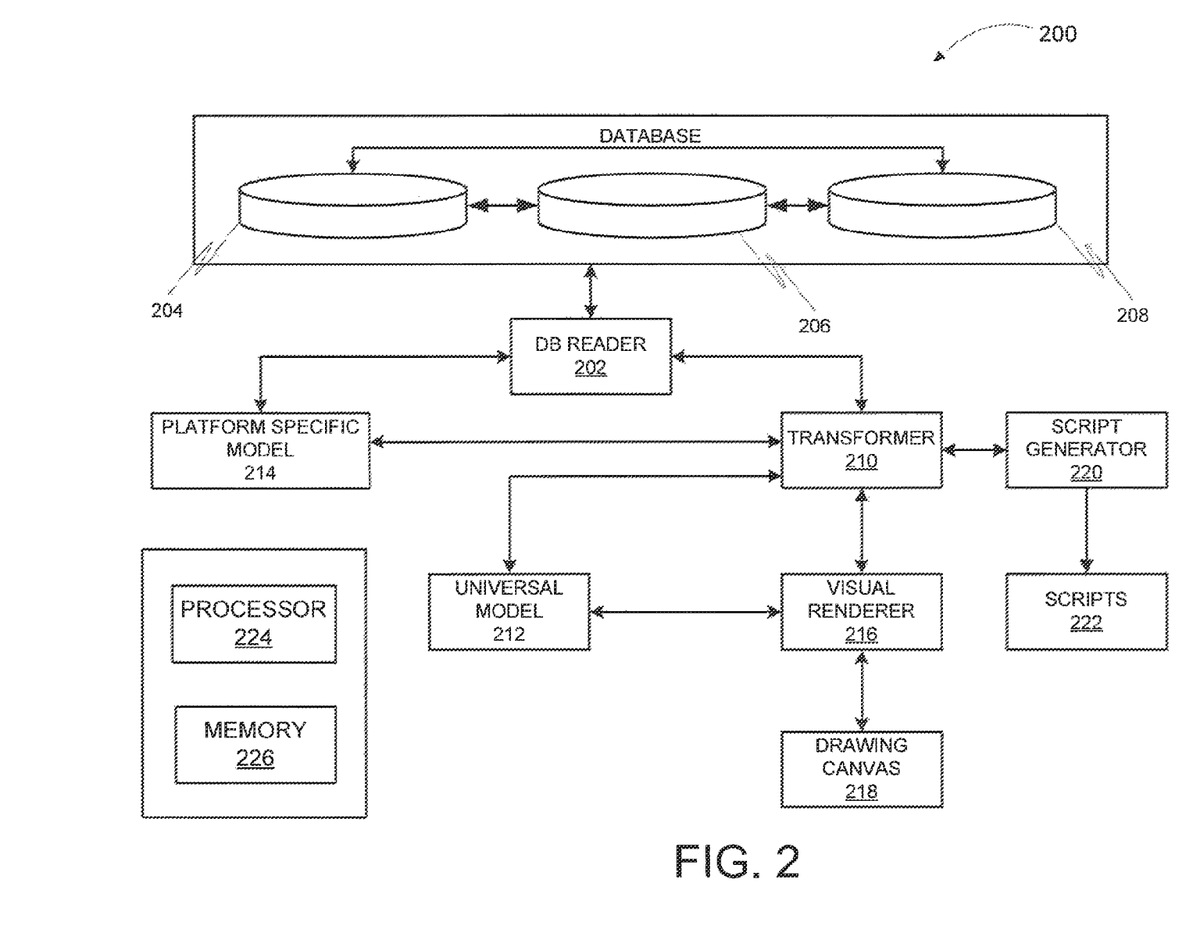
FIG. 2 illustrates an exemplary database replication data system consistent with the disclosed embodiments.

FIG. 2 illustrates an exemplary database replication data system 200 according to some embodiments of the present disclosure. Database replication data system 200 may include database (DB) reader 202. DB reader 202 may read information from databases, which may be input by a user. System 200 may also include one or more databases 204, 206 and 208. Databases 204, 206, and 208 may be available in the one or more data centers 102, 104, 106, and 108. System 200 may include replication model transformer 210, which may be used to transform platform-specific replication model 214 into universal replication model 212 and transform universal replication model 212 into platform-specific replication model 214. System 200 may also include visual renderer 216, which may render components of universal replication model 212 in drawing canvas 218. Further, system 200 may include a script generator that generates scripts 222 for platform-specific replication model 214.

The database replication data system 200 may be implemented with instructions contained on a computer-readable storage medium and configured as shown in FIG. 2. The functionality of each of modules 202 and 210-222 may be described by instructions stored in a memory device, such as memory 226, and executed by a processor, such as processor 224, which may be housed in a computer system. The system 200 may include a database (DB) reader 202 to which a user may provide DB connection parameters corresponding to one or more of databases 204, 206 and 208.

Databases 204, 206, and 208 may be available in the one or more data centers 102, 104, 106, and 108. The connection parameters may define information required for DB reader 202 to connect to a particular database. DB connection parameters may include a DB_userName, a DB_password, a DB_url, and a DB_class_name. These parameters may be used to establish communication between DB reader 202 and one or more of databases 204, 206, and 208. The DB_userName and DB_password parameters may respectively define a username and password to login to the database. The DB_url parameter may define the database URL, and DB_class_name may set out the database driver's fully qualified class name.

DB reader 202 may connect to all or some of the available databases in a particular data center. DB reader 202 may extract required DB data from these databases, including DB server replication configuration, table metadata, and table level replication configuration information. An exemplary process of connecting and extracting data from databases performed by the DB reader 202 is shown below in FIGS. 3 and 4.

Data centers 102, 104, 106, and 108 may use replication models which may be provided by one or more vendors (for example, Sybase replication, Oracle Streams, and Golden Gate). The vendor replication models, each being unique to a particular vendor, may be referred to as platform-specific replication models. To ensure interoperability among various replication models, replication model transformer 210 may provide the capability to transform a platform-specific replication model to a universal replication model 212, and may provide the capability to transform universal replication model 212 to a platform-specific replication model 214. Universal replication model 212 may be non-specific to any of the vendors and vendors products and may enable modeling of the replication of tables and databases included in database servers, such as servers in connection with data centers 102, 104, 106, and 108. Universal replication model 212 may also employ a generic replication domain modeling language.

As stated above, replication model transformer 210 may obtain a universal replication model 212 by transforming a platform-specific replication model 214 into a universal replication model 212. This may be performed by having the DB reader 202 output a platform-specific replication model 214 to the replication model transformer 210, and then having replication model transformer 210 output a universal replication model 212. An exemplary process for generating platform-specific and universal replication models is explained in further detail below with respect to FIGS. 3-5.

Thereafter, a visual renderer 216 may render the components of universal replication model 212 on a drawing canvas 218. The visual renderer 216 may facilitate a user's interaction with the drawing canvas 218 and the underlying universal replication model 212. Drawing canvas 218 may allow designers to edit or make a modification to universal replication model 212 rendered in the drawing canvas 218. The drawing canvas 218 may include a graphical view, a grid view, or a tree view. An exemplary process for the visual render and drawing canvas is explained in further detail below with respect to FIGS. 3 and 6.

Once modification of universal replication model 212 is complete and rendered in the drawing canvas 218, universal replication model 212 and a selected platform may be input into script generator 220, and, along with transformer 210, may generate a platform-specific replication model corresponding to the selected platform. Script generator 220 may then generate scripts 222 corresponding to the selected platform. Thus, universal replication model 212 may be input, and then the platform-specific scripts 222 may be generated as output. This may be known as forward engineering.

The script generator 220 may further include a universal script generator (not shown in FIG. 2) that may use universal replication model 212 and information related to a selected platform for which the scripts are to be generated as input, and may generate scripts for configuring conflict handlers based on the model and the information. The universal script generator may be a dispatcher component that delegates the script generation task to a respective platform-specific script generator, which may also be included in script generator 220, which may then generate the required platform-specific scripts. The platform-specific script generator may be added to the script generator 220 when new products from vendors are configured into system 200. Also, a script generator corresponding to existing vendor products may be configured in script generator 220 when those existing products are enhanced to support additional features.

Figure 3:
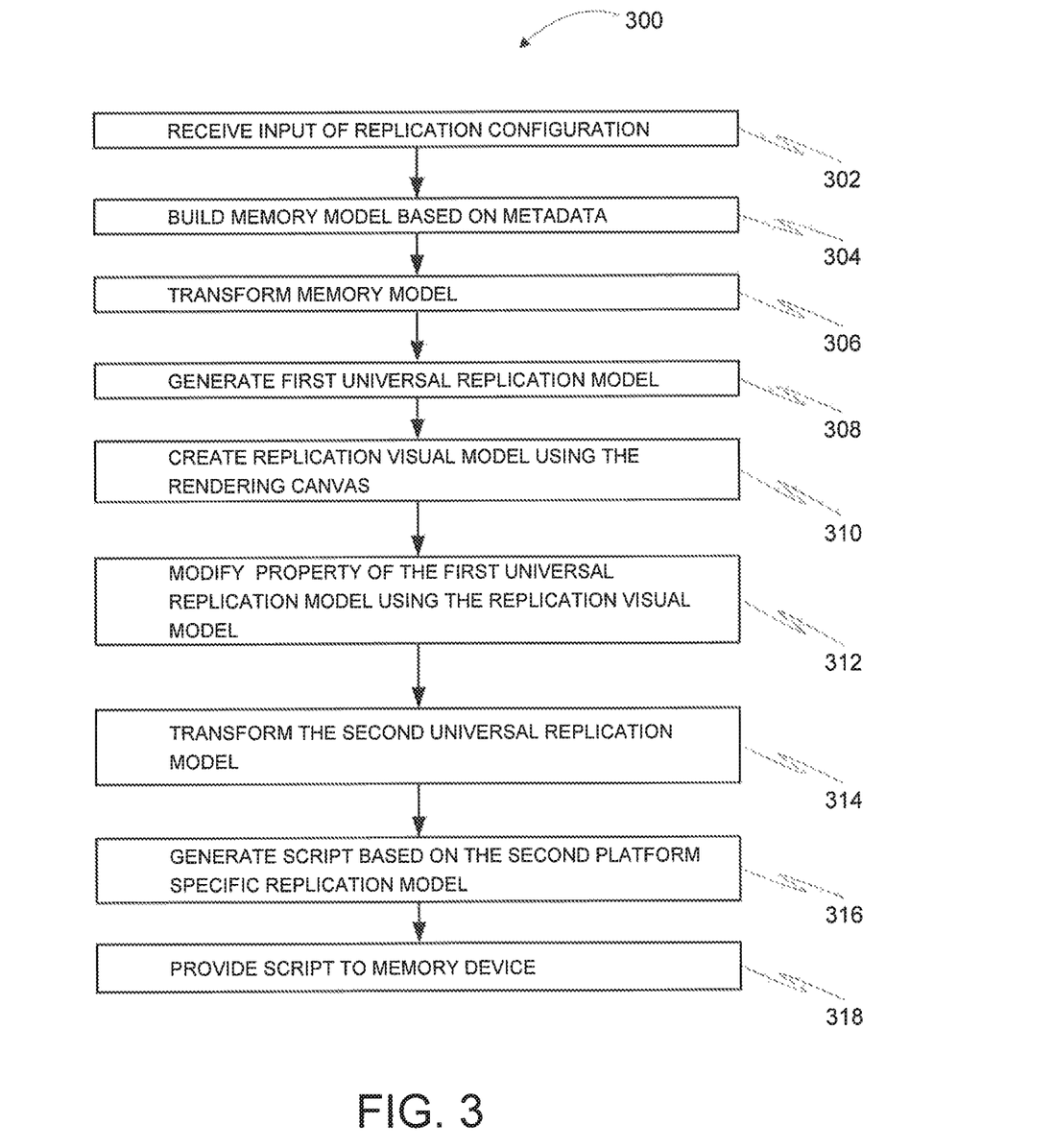
FIG. 3 illustrates an exemplary database replication data method consistent with the disclosed embodiments.

FIG. 3 illustrates an exemplary database replication data process 300 consistent with exemplary embodiments of the present disclosure. At step 302, the DB reader 202 may connect to and receive information from databases, such as databases 204, 206 and 208, in data centers, such as data centers 102, 104, 106, and 108, using database connection parameters, which can be provided by a user. The databases may be of the same or different platform. Thus process 300 can facilitate database replication when one database of a first format needs to replicate data to another database of a different format. Then DB reader 202 receives data corresponding to each database. This data may include DB server replication configuration metadata, table metadata, and table level replication configuration information. Databases 204, 206 and 208 may be in any configuration at this point, such as active-active or active-passive configuration.

Next, at step 304, the DB reader 202 may build a memory model, which may include the specific tables and connections of a particular database, based on metadata for each database 204, 206, and 208. The metadata may include table name data, database schema information, database connection information, and replication relationships derived from the plurality of databases. Each database may have an individual corresponding memory model built by DB reader 202. The memory model may capture the required database data for further processing. In one embodiment, the memory model, or Table Level Replication Information Model (TL-RIM), may be interlinked with other models and may reference elements such as object in multiple models—a DB Server Replication Model, a Table Level Replication Model, a Table Metadata Model, a Replication Configuration Information Model, a Table Replication Rule Model, and a Transformed Replication Configuration Information Model. These exemplary models are explained in detail below with respect to FIG. 4.

At step 306, the transformer 210 may transform the memory models to a first platform-specific replication model, configured for a first platform. The first platform may be specified by a user and received as input into the system 200, or system DB reader 202 may determine a platform from the information received in step 302. The first platform-specific replication model may be configured to replicate databases of a particular vendor, and therefore may include specific configurations for that vendor and/or platform. The transformer 210 then generates a first universal replication model 212 based on the first platform-specific replication model at step 308. Universal replication model 212 may be configured for a plurality of platforms. Universal replication model 212 may or may not include the platform/vendor specific database configuration data, but may include general configuration data that may work for a plurality of platforms/vendors.

At step 310, the visual renderer 216 may create a replication visual model of universal replication model 212 using drawing canvas 218. The drawing canvas 218 may display a subset of the plurality of databases 204, 206, and 208, and the replication visual model may depict the replication relationships among these databases. The replication visual model may also include configurable database target and source properties, which may dictate which database table to replicate and to which database table that replicated data may be sent.

The drawing canvas 218 may be configured to receive user-identified modifications of the first universal replication model 212. Accordingly, a user may modify a property of the first universal replication model using the replication visual model to create a modified or second universal replication model at step 312. Properties that may be modified may include adding a table, adding a connection from one database of the plurality of databases to another database, modifying existing configurations of the databases, linking a first table of a first database to a second table of a second database, adding a database rule, or modifying a rule. The second universal replication model may also include conflict handlers, which may be based on the target and source properties. Conflict handlers may also be modified by a user.

Next, at step 314, the transformer 210 transforms the second or modified universal replication model to a second platform-specific replication model. This may be done automatically, such as having system 100 receive an input from a user for "Forward Engineering." The second platform-specific replication model may be selected by a user and configured for a second platform whose information, such as name and version, may be captured by transformer 210. At step 316, the script generator 220 generates one or more scripts based on the second platform-specific replication model. The generated scripts may also unset an older configuration associated with a platform, and may set the latest modified configurations. Finally, at step 318, the script generator 220 provides the scripts to a memory, such as memory 226. From here, the second platform-specific replication model may be transformed to a universal replication model, and the process may repeat.

Figure 4:
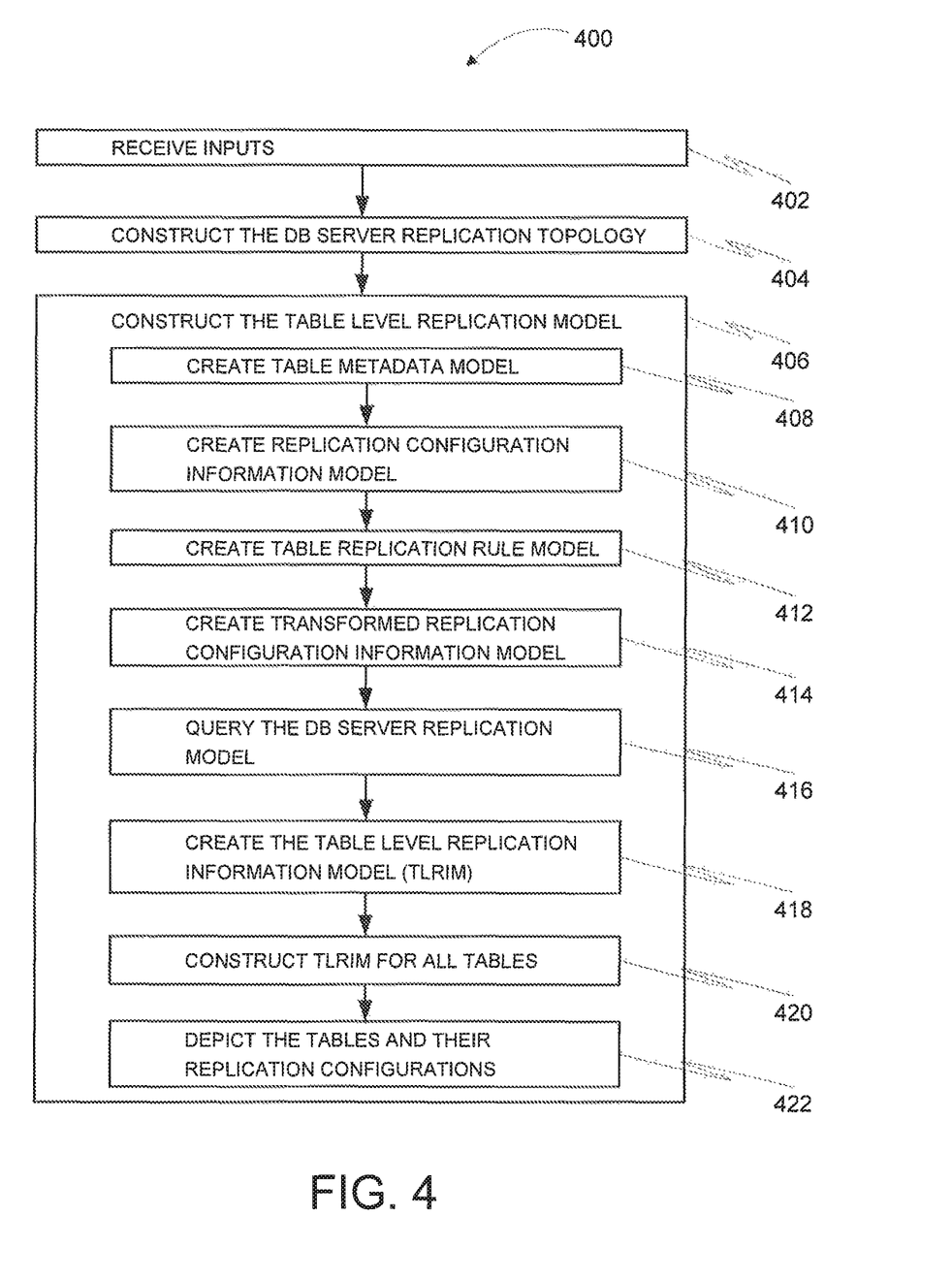
FIG. 4 illustrates an exemplary method to construct a memory model consistent with the disclosed embodiments.

FIG. 4 illustrates an exemplary method 400 to construct memory models according to exemplary embodiments of the present disclosure. At step 402, the DB reader 202 may read data from databases, such as databases 204, 206, and 208, located in data centers 102, 104, 106, and 108. The data may include replication configuration data for each database 204, 206, and 208 and metadata, such as table metadata, for the each database 204, 206, and 208.

Next at step 404, the DB reader 202 may construct the DB Server Replication Topology. The DB reader 202 may retrieve the DB servers' configuration data, connection data, and metadata, and may execute the following steps:

1. Start and extract the replication configuration data from the first server (e.g., U.S. data center 108 or other data center).
2. Identify the other connected DB servers (e.g., India data center 102, Europe data center 104 and Australia data center 106) that are present in the current server model. This step identifies the servers that are connected to the current server, which may represent the connection topology among the DB servers.
3. Depict the databases visually (as shown in FIGS. 1 and 2) and connect them based on the connection data to obtain the DB Server Replication Topology.

Thereafter, at step 406, the DB reader 202 may construct a Table Level Replication Model. Starting with a first server, such as U.S. data center 108, the DB reader 202 reads all the tables in the database schema, and iterates through the list of tables in the schema to extract information. Accordingly, for each table, the DB reader 202 may extract the following information and execute steps 408-422 explained below in further detail.

First, at step 408, the DB reader 202 may extract table name and schema information to create a Table Metadata Model. Then at step 410, DB reader 202 may extract replication configuration information, such as a capture or source database, a DB link for target database, an apply process name, a capture process name, any conflict handler information, and an apply or target database, to create a Replication Configuration Information Model (explained in further detail in conjunction with FIG. 5 below). The capture process may be configured to capture data, which may or may not have been updated or changed, from a source table in a source database, which may be then transferred using a Data Transport Process to a target database and applied to the target database using the apply process. Thereafter, at step 412, DB reader 202 may extract any rules that are used to transform the schema, table names, and the like into a Table Replication Rule Model.

At this point, objects, such as a schema name, a table name, or a column name, or similar data, may be modified in a data center. Thereafter, the modified or transformed schema names, table names, column names, and the like, are derived to create a Transformed Replication Configuration Information Model at step 414.

Using the names of the objects present in the Transformed Replication Configuration Information Model, the DB reader 202 may sequentially query the DB Server Replication Models, which are models that may comprise a Table Level Replication Model for all the tables and the DB level configurations for a given DB server, for all other servers and identify the tables contained in these models at step 416. The identified tables may then represent the target tables associated with the source table. Then, at step 418, a Table Level Replication Information Model (TLRIM) or memory model, may be constructed using the data contained in the Table Metadata Model, Configuration Information Model, Replication Rule Model, and Transformed Replication Configuration Information Model. This process is explained in further detail below with respect to FIG. 5. The TLRIM represents the replication configurations of the database tables in the DB servers and contains information aggregated from the models of all the DB servers. Further, the TLRIM, the Transformed Replication Configuration Information Model, and the Table Metadata Model may include database column and field level details.

Next, at step 420, the steps of process 400 are repeated to construct a TLRIM for all tables in each DB Server Replication Model. Finally at step 422, using the TLRIM objects, the database tables, and their replication configurations may be depicted in, for example, a configurable designer canvas on a display.

Figure 5:
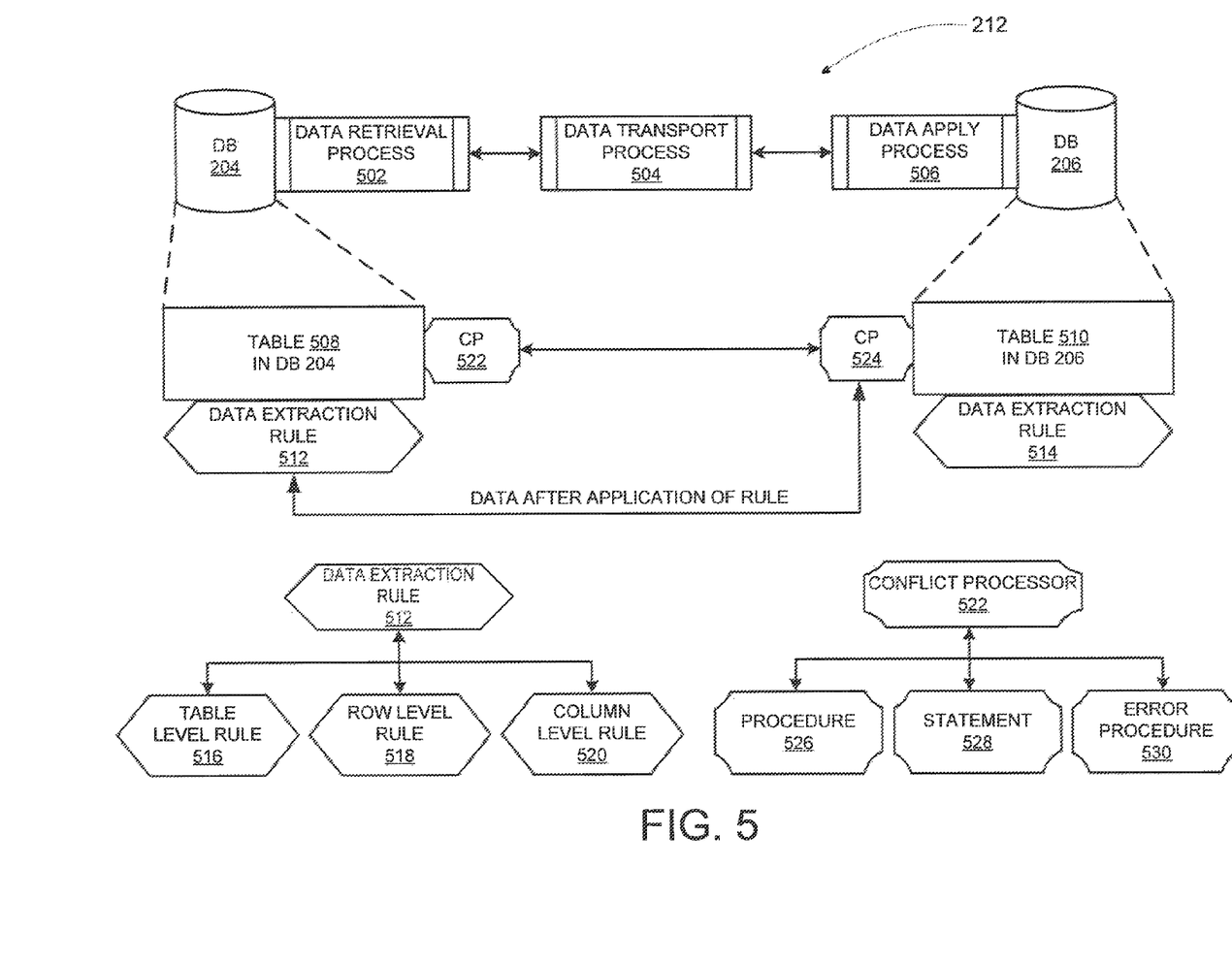
FIG. 5 illustrates an exemplary universal replication model consistent with the disclosed embodiments.

FIG. 5 illustrates an exemplary universal replication model 212, as shown in FIG. 2, according to an exemplary embodiment of the present disclosure. Universal replication model 212 may include DBs 204 and 206. While universal replication model 212 shows two databases, any number of databases can be used. Universal replication model 212 may further include data retrieval process 502, in which DB reader 202 may retrieve data from a database, such as DB 204, and data apply process 506, in which DB reader 202 may apply any retrieved data to a database, such as DB 206. DB reader 202 may use data transport process 504 to transfer retrieved data from DB 204 and DB 206 through data retrieval process 502 and data apply process 506.

Figure 6:
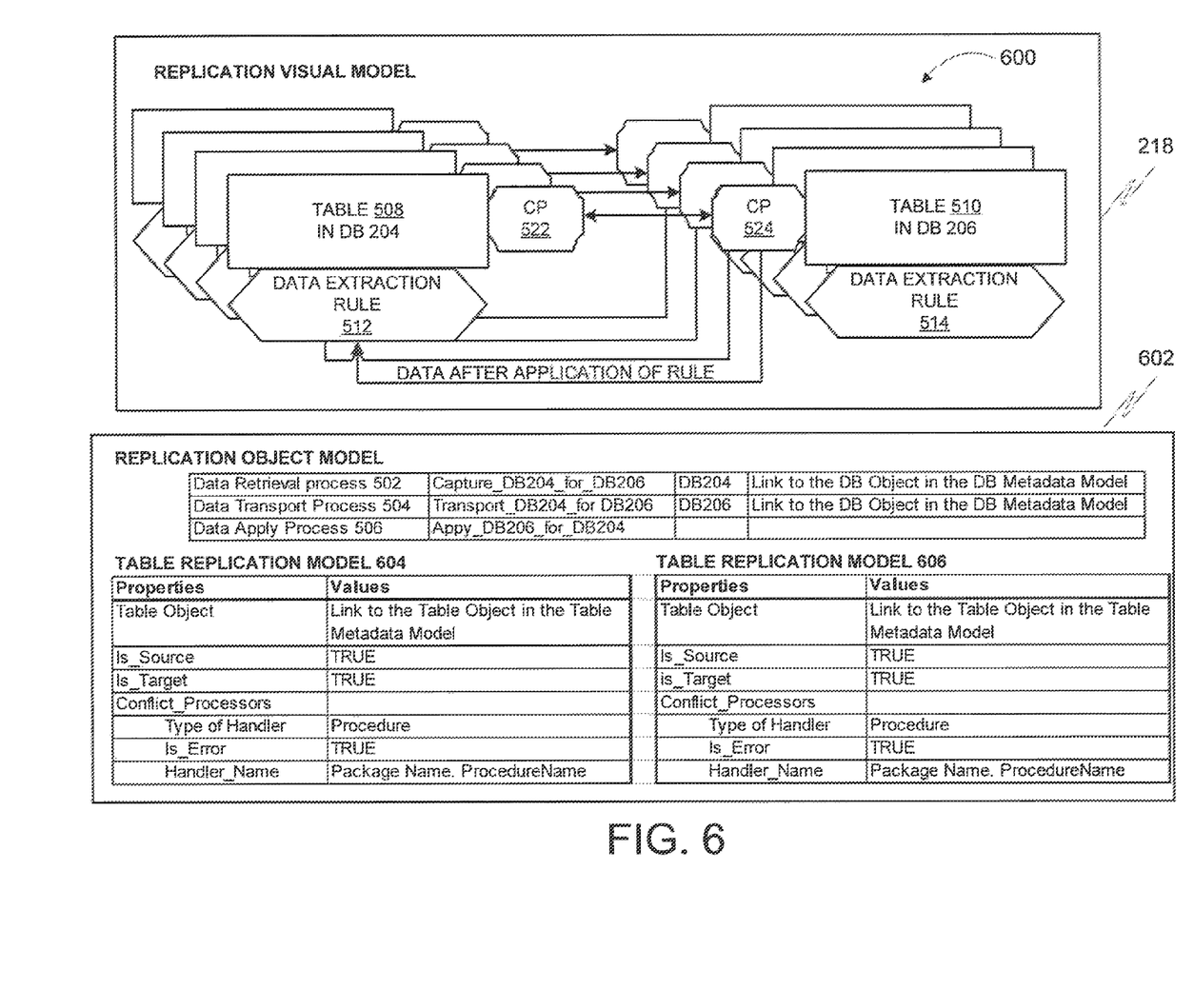
FIG. 6 illustrates an exemplary replication visual model and an exemplary replication object model consistent with the disclosed embodiments.

DBs 204 and 206 may contain one or more tables. For example, each of DBs 204 and 206 may contain table 508 and 510, respectively. Data extraction rules 512 and 514, which may govern the extraction of data from a table, may be associated with tables 508 and 510. As shown in FIG. 5, a data extraction rule, such as rule 512 may include table level rule 516, row level rule 518, and column level rule 520, which may govern tables, rows, and columns, respectively. Data extraction rules 512 and 514 may be used by the data retrieval process 502. Universal replication model 212 may further include Conflict Processors (CPs) 522 and 524, which may be associated with tables 508 and 510, respectively. CPs 522 and 524 may be used to resolve any conflicts associated with the replication. As shown in FIG. 6, CPs, such as CP 522, may include a user procedure 526, such as a platform's procedure that confirms to a particular specification as mandated by the vendor product, a statement 528, and/or an error procedure 530. The CPs are explained in further detail below with respect to FIG. 6.

Data retrieval process 502 may retrieve data from DB 204 and also may retrieve any changes made to database tables, database schemas, or changes associated with database 204. A data transport process 504 may transfer data from DB 204 to DB 206. Data apply process 506 may then apply the transferred data in DB 206, thereby updating DB 206 with any changes retrieved from DB 204. Data retrieval process 502, the data transport process 504, and data apply process 506 are explained in further detail below with respect to FIG. 6.

Universal replication model 212 may be represented by a universal replication modeling language that may describe the general characteristics of replicated databases in, for example, an active-active configuration. This modeling language may be generic and abstracted from replication products previously associated with system 100, such as Sybase replication, Oracle Streams, or Golden Gate. This modeling language also can be extended to capture additional features of other replication products that have not been previously associated with system 100, for example.

Additionally, data may be replicated from a table 508 in DB 204 to a table 510 in DB 206. Data extraction rules 512 and 514 may be used to govern the extraction of data from the DB 204 and the DB 206 based on selected table columns for replication. For example, a data extraction rule, such as rule 512, may be used to filter out a set of information, such as customer name or financial information, when data is being replicated to a database. Also, rules may be used to modify tables, such as by renaming table names or rows or columns, or by adding or removing rows or columns. Data extraction rules 512 and 514 may include table level rule 516, row level rule 518, and column level rule 520, which may govern tables, rows, and columns, respectively. Data extraction rules 512 and 514 may be used by DB reader 202 when performing data retrieval process 502. A table level rule may indicate, for example, that table locations may be replicated, and a row level rule may indicate, for example, that records with a threshold level may be replicated. Additional rules may be used for filtering rows. A column level rule may indicate, for example, which columns may be removed during replication.

Universal replication model 212 may further include Conflict Processors (CPs) 522 and 524 to resolve any conflicts associated with the replication. After a rule has been implemented in a table of a database, such as DB 204, the rule can be passed to one or more CPs in another database, such as CP 524 in DB 206, so as to prevent any conflicts that may happen because of the rule. Also, when one or more CPs detects a conflict between data in a database, such as DB 206, database data detailing this conflict may be passed to another database, such as DB 204, to create a rule to prevent this conflict the next time a replication occurs. The CPs are explained in further detail below with respect to FIG. 6.

FIG. 6 illustrates a replication visual model 600 and a replication object model 602 according to an exemplary embodiment of the present disclosure. The replication visual model 600, which may include information derived from a universal replication model, such as universal replication model 212, and may be rendered in the drawing canvas 218 by the visual renderer 216. Replication object model 602 may be an in-memory model, which may be, for example, an object model constructed using object oriented principles. Thus, replication visual model 600 may comprise a collection of the replication object models.

As previously described above with respect to FIG. 4, after memory models are generated for the databases of interest, they are depicted on a display in, for example, a configurable designer canvas. Using an input device, such as a mouse, or finger or stylus on a touch screen display, a user may drag or move a table, such as table 508, from a memory model associated with a database, such as DB 204, may drag or move another table, such as table 510, from a memory model associated with another database, such as DB 206, and drop the tables onto drawing canvas 218.

Visual renderer 216 may then construct Replication Object Model 602 and also construct table replication models 604 and 606 for the chosen tables and associate table replication models 604 and 606 to the Replication Object Model 602. Visual Render 216 may then display models 604 and 606 in replication object model 602, which may then be associated with the replication visual model 600 on the drawing canvas 218.

Further, the user may draw a line, using an input device such as a mouse, finger, or stylus on a display, such as a touch screen display, connecting, for example, table 508 in DB 204 to the table 510 in DB 206. The visual renderer 216 may then set the "Is_Source" and "Is_Target" properties in the table replication models 604 and 606, according to the direction of the arrowed line. The double headed arrow between tables 508 and 510 indicates that both tables 508 and 510 act as source and target simultaneously. Accordingly, the values for the "Is_Source" and "Is_Target" properties is set to "True". In another embodiment, if table 508 was the source and table 510 was the target, "Is_Source" and "Is_Target" for table replication model 604 would be respectively set to "TRUE" and "FALSE", and "Is_Source" and "Is_Target" for table replication model 606 would be respectively set to "FALSE" and "TRUE".

Additionally, the user may configure a conflict handler processor for the tables. Accordingly, the visual renderer 216 may set the properties "Type of Handler", "Is_Error" and "Handler_name" properties in the table replication models 604 and 606.

Replication object model 602 may also contain definitions of data retrieval process 502, data transport process 504, and data apply process 506, which, as described above with respect to FIG. 5, are used in replicating data from one database to another. Additionally, data retrieval process 502 may capture data from DB 204 for DB 206 using, for example, the DB 204 transaction logs which log previous transactions in DB 204.

Database replication software, which may be stored in memory 226 and performed by processor 224, may be configured to use data retrieval process 502 to regularly store a read and a write position to a memory, which insures data may be retrieved without any loss, such as in the case of system or database failure. Further, data retrieval process 502 may be linked to objects, such as a schema name, a table name, or a column name, in a memory model of a database, such as a memory model corresponding to DB 204 or 206.

Database replication software, which may be stored in memory 226 and performed by processor 224, may be configured to use data transport process 504 to transport data from DB 204 directly to DB 206, or via intermediary databases. Further, data transport process 504 may be linked to objects, such as a schema name, a table name, or a column name, in a memory model of a database, such as the memory model corresponding to DB 204 or 206, thereby allowing transfer of the objects of one database to another database.

Database replication software, which may be stored in memory 226 and performed by processor 224, may be configured to use data apply process 506 to apply data retrieved from DB 204 into DB 206. Data apply process 506 may apply this data using either Data Manipulation Language (DML), which may include deletes, updates, and inserts, or Data Description Language (DDL), which may include create, drop, and alter statements.

Figure 7:
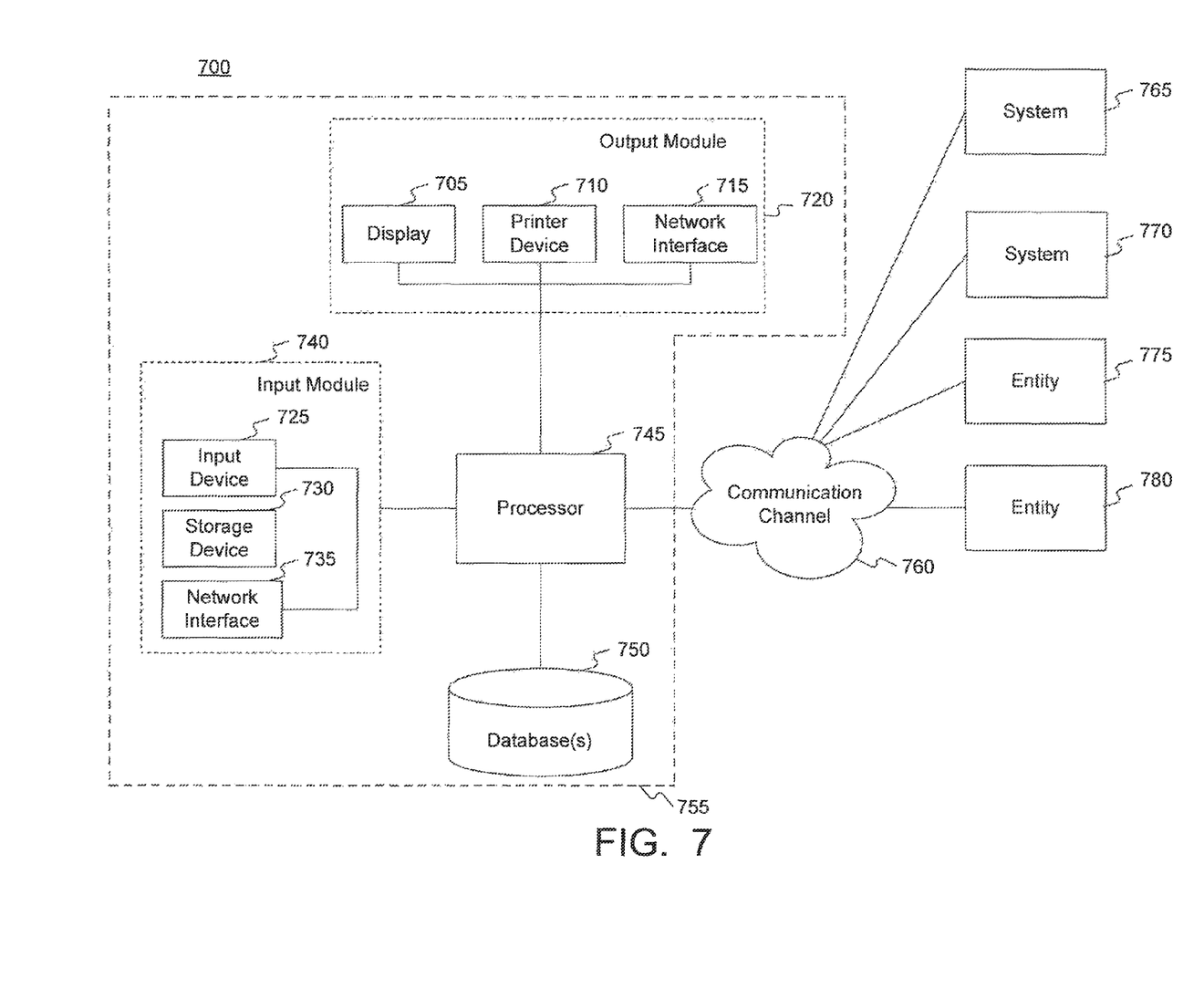
FIG. 7 is a block diagram of an exemplary computer system used for database replication consistent with the disclosed embodiments.

FIG. 7 illustrates an exemplary system 700 that can be implemented in conjunction with the disclosed embodiments. Referring to FIG. 7, the system 700 may include a computing platform 755. The computing platform 755 may include an entity capable of processing information such database data or input from a user. In an exemplary implementation, the computing platform may include a data processor 745 such as a PC, UNIX server, or mainframe computer for performing various functions and operations. Data processor 745 may be similar to processor 224. Data processor 745 may be implemented, for example, by a processor specifically configured for carrying-out the features and operations disclosed herein. Moreover, processor 745 may be implemented or provided with a wide variety of components or systems including, for example, one or more of the following: one or more central processing units, a co-processor, memory, registers, and other data processing devices and subsystems. Processor 745 may interface with, or be embedded in, one or more systems 765 and 770, such as servers, data centers, and the like, or other entities 775 and 780, such as users, devices, platform products, and the like.

Processor 745 may also communicate with input module 740 and/or output module 720 using connections or communication links, as illustrated in FIG. 7. Alternatively, communication between processor 745 and input module 740 or output module 720 may be achieved using a network, such as communication channel 760. Processor 745 may be located in the same location or at a geographical separate location from input module 740 and/or output module 720 by using a network. For example, a user in the United States may operate processor 745 located in India with input module 740 located in the United States.

Input module 740 may be implemented with a wide variety of devices to receive and/or provide information. Referring to FIG. 7, input module 740 may include an input device 725, a storage device 730, and/or a network interface 735. Input device 725 may also include a keyboard, a mouse, a disk drive, telephone, or any other suitable input device for receiving and/or providing information to processor 745. Although FIG. 7 only illustrates a single input module 740, a plurality of input modules 740 may also be used.

Storage device 730, which may be similar to memory 112, may be implemented with a wide variety of systems, subsystems and/or devices for providing memory or storage including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage and/or memory.

Network interface 735 may exchange data between any of the components of system 700, for example between the communication channel 760 and processor 745 and may also exchange data between the input module 740 and the processor 745. In one aspect of the disclosed embodiments, network interface 735 may permit a connection to at least one or more of the following networks: an Ethernet network, an Internet protocol network, a telephone network, a radio network, a cellular network, or any other network capable of being connected to input module 740.

Output module 720 may include a display 705, a printer 710, and/or a network interface 715. The output module 720 may be used to provide a depiction of a database replication model and the like. Additionally, a user may view drawing canvas 218 on output model 720. Further, the output from processor 745 may be displayed or viewed through display 705 (e.g., a cathode ray tube, liquid crystal display, or touch screen) and/or printer device 710. For example, a depiction of a database replication model may be viewed on display 705 and/or printed on printer device 710. Although FIG. 7 only illustrates a single output module 720, a plurality of spatially separated output modules 720 may be used.

The printer device 710 may provide output that includes information that describes a depiction of a database replication model. Network interface 715 may exchange data between the output module 720 and the processor 745 and/or between the processor 745 and the communication channel 760. The network interface 715 may permit connection to at least one or more of the following networks: an Ethernet network, and Internet protocol network protocol network, a telephone network, a cellular network, a radio network, or any other network capable of being connected to output module 720.

Database 750 may be similar to or incorporate the databases relating to the disclosed embodiments, such DBs 204, 206, and 208. Although the database 750 is shown in FIG. 7 as being located with the processor 745, a skilled artisan would recognize that the database (or databases) may be located anywhere (or in multiple locations) and connected to the computing platform via direct links or networks.

Communication channel 760 may include, alone or in any suitable combination a telephony-based network, a local area network (LAN), a wide area network (WAN), a dedicated intranet, the Internet, or a wireless network. Further, any suitable combination of wired and/or wireless components and systems may be incorporated into communication channel 760.

While the exemplary methods and processes may be described herein as a series of steps, it is to be understood that the order of the steps may be varied. In particular, non-dependent steps may be performed in any order, or in parallel.

The specification describes systems and methods for improved replication configurations using replication modeling and transformation. The illustrated steps are set out to explain the embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art based on the teachings contained herein. Such alternatives fall within the scope and spirit of the disclosed embodiments.

Other embodiments will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A method for reverse engineering database replication configuration data performed by at least one processor connected to a plurality of databases, the method comprising:

receiving, using the at least one processor, an input of replication configuration data for a plurality of databases, the replication configuration data including conflict handler information associated with the plurality of databases;

building, using the at least one processor, at least one memory model based on metadata accessed from the plurality of databases, wherein the at least one memory model is interlinked with a database Server Replication Model, a Table Level Replication Model, a Table Metadata Model, a Replication Configuration Information Model, a Table Replication Rule Model, and a Transformed Replication Configuration Information Model, and wherein the at least one memo model references to one or more objects in the Table Level Replication Model, the Table Metadata Model, the Replication Configuration Information Model, the Table Replication Rule Model, or the Transformed Replication Configuration Information Model;

transforming, using the at least one processor and based on the replication configuration data, the at least one memory model to a first platform-specific replication model, the first platform-specific replication model being configured for a first platform;

generating, using the at least one processor and based on the first platform-specific replication model, a first universal replication model configured for a plurality of platforms, the first universal replication model including a rendering canvas configured to receive at least one user-identified modification of the first universal replication model, wherein the user-identified modification includes configuring one or more properties of a conflict handler processor and adding a connection from one database of the plurality of databases to another database of the plurality of databases;

creating, using the at least one processor and based on the first universal replication model, a replication visual model using the rendering canvas, the replication visual model including configurable target and source properties, wherein the configurable target and source properties includes the one or more properties of the conflict handler processor;

modifying, using the at least one processor, a property of the first universal replication model using the replication visual model to create a second universal replication model, wherein modifying the property of the first universal replication model includes linking a first table of a first database of the plurality of databases to a second table of a second database of the plurality of databases, and wherein the second universal replication model includes:

a first conflict handler associated with a first database of the plurality of databases and a second conflict handler associated with a second database of the plurality of databases, the first database being configured for the first platform, and the second database being configured for a second platform, a first data extraction rule for the first database of the plurality of databases, the first data extraction rule being passed to the second conflict handler for detecting a first conflict, and a second data extraction rule for the second database of the plurality of databases, the second data extraction rule being passed to the first conflict handler for detecting a second conflict;

transforming, using the at least one processor, the second universal replication model to the second platform-specific replication model, the second platform-specific replication model being configured for a second platform;

generating, using the at least one processor, at least one script based on the second platform-specific replication model; and providing, using the at least one processor, the at least one script to a memory device.

2. The method of claim 1, wherein the metadata comprises table metadata derived from the plurality of databases.

3. The method of claim 1, wherein the first conflict handler and the second conflict handler are generated based on the target and source properties.

4. The method of claim 1, wherein the rendering canvas includes at least one of a graphical view, a grid view, a text view, or a tree view.

5. The method of claim 1, wherein a subset of the plurality of databases is displayed in the rendering canvas.

6. The method of claim 1, wherein the at least one user-identified modification comprises at least one of:
adding a table;
modifying existing configurations of the plurality of databases;
linking a first table of the first database of the plurality of databases to a second table of the second database of the plurality of databases;
adding a rule; or
modifying a rule.

7. The method of claim 1, wherein the plurality of databases is in active-active or active-passive configuration.

8. A system for reverse engineering database replication configuration data, comprising:
at least one processor connected to a plurality of databases; and
a memory device operatively connected to the at least one processor and storing processor-executable instructions for:
receiving, using the at least one processor, an input of replication configuration data for a plurality of databases, the replication configuration data including conflict handler information associated with the plurality of databases;
building, using the at least one processor, at least one memory model based on metadata accessed from the plurality of databases, wherein the at least one memory model is interlinked with a database Server Replication Model, a Table Level Replication Model, a Table Metadata Model, a Replication Configuration Information Model, a Table Replication Rule Model, and a Transformed Replication Configuration Information Model, and wherein the at least one memory model references to one or more objects in the Table Level Replication Model, the Table Metadata Model, the Replication Configuration Information Model, the Table Replication Rule Model, or the Transformed Replication Configuration Information Model;
transforming, using the at least one processor and based on the replication configuration data, the at least one memory model to a first platform-specific replication model, the first platform-specific replication model being configured for a first platform;

generating, using the at least one processor and based on the first platform-specific replication model, a first universal replication model configured for a plurality of platforms, the first universal replication model including a rendering canvas configured to receive at least one user-identified modification of the first universal replication model, wherein the user-identified modification includes configuring one or more properties of a conflict handler processor and adding a connection from one database of the plurality of databases to another database of the plurality of databases;

creating, using the at least one processor and based on the first universal replication model, a replication visual model using the rendering canvas, the replication visual model including configurable target and source properties, wherein the configurable target and source properties includes the one or more properties of the conflict handler processor;

modifying, using the at least one processor, a property of the first universal replication model using the replication visual model to create a second universal replication model, wherein modifying the property of the first universal replication model includes linking a first table of a first database of the plurality of databases to a second table of a second database of the plurality of databases, and wherein the second universal replication model includes:
a first conflict handler associated with a first database of the plurality of databases and a second conflict handler associated with a second database of the plurality of databases, the first database being configured for the first platform, and the second database being configured for a second platform,
a first data extraction rule for the first database of the plurality of databases, the first data extraction rule being passed to the second conflict handler for detecting a first conflict, and
a second data extraction rule for the second database of the plurality of databases, the second data extraction rule being passed to the first conflict handler for detecting a second conflict;

transforming, using the at least one processor, the second universal replication model to the second platform-specific replication model, the second platform-specific replication model being configured for a second platform;

generating, using the at least one processor, at least one script based on the second platform-specific replication model; and providing, using the at east one processor, the at least one script to a second memory device.

9. The system of claim 8, wherein the metadata comprises table metadata derived from the plurality of databases.

10. The system of claim 8, wherein the first a conflict handler and the second conflict handler are generated based on the target and source properties.

11. The system of claim 8, wherein the rendering canvas includes at least one of a graphical view, a grid view, a text view, or a tree view.

12. The system of claim 8, wherein a subset of the plurality of databases is displayed in the rendering canvas.

13. The system of claim 8, wherein the at least one user-identified modification comprises at least one of:
adding a table;

modifying existing configurations of the plurality of databases;

linking a first table of the first database of the plurality of databases to a second table of the second database of the plurality of databases;

adding a rule; or modifying a rule.

14. The system of claim 8, wherein the plurality of databases is in active-active or active-passive configuration.

15. A non-transitory computer-readable storage medium containing instructions to configure at least one processor connected to a plurality of databases to perform a method for reverse engineering database replication configuration data, the method comprising:

receiving, using the at least one processor, an input of replication configuration data for a plurality of databases, the replication configuration data including conflict handler information associated with the plurality of databases;

building, using the at least one processor, at least one memory model based on metadata accessed from the plurality of databases, wherein the at least one memory model is interlinked with a database Server Replication Model, a Table Level Replication Model, a Table Metadata Model, a Replication Configuration Information Model, a Table Replication Rule Model, and a Transformed Replication Configuration information Model, and wherein the at least one memory model references to one or more objects in the Table Level Replication Model, the Table Metadata Model, the Replication Configuration Information Model, the Table Replication Rule Model, or the Transformed Replication Configuration Information Model;

transforming, using the at least one processor and based on the replication configuration data, the at least one memory model to a first platform-specific replication model, the first platform-specific replication model being configured for a first platform;

generating, using the at least one processor and based on the first platform-specific replication model, a first universal replication model configured for a plurality of platforms, the first universal replication model including a rendering canvas configured to receive at least one user-identified modification of the first universal replication model, wherein the user-identified modification includes configuring one or more properties of a conflict handler processor and adding connection from one database of the plurality of databases to another database of the plurality of databases;

creating, using the at least one processor and based on the first universal replication model, a replication visual model using the rendering canvas, the replication visual model including configurable target and source properties, wherein the configurable target and source properties includes the one or more properties of the conflict handler processor;

modifying, using the at least one processor, a property of the first universal replication model using the replication visual model to create a second universal replication model, wherein modifying the property of the first universal replication model includes linking a first table of a first database of the plurality of databases to a second table of a second database of the plurality of databases, and wherein the second universal replication model includes:

a first conflict handler associated with a first database of the plurality of databases and a second conflict handler associated with a second database of the plurality of databases, the first database being configured for the first platform, and the second database being configured for a second platform, a first data extraction rule for the first database of the plurality of databases, the first data extraction rule being passed to the second conflict handler for detecting a first conflict, and a second data extraction rule for the second database of the plurality of databases, the second data extraction rule being passed to the first conflict handler for detecting a second conflict;

transforming, using the at least one processor, the second universal replication model to the second platform-specific replication model, the second platform-specific replication model being configured for a second platform;

generating, using the at least one processor, at least one script based on the second platform-specific replication model; and providing, using the at least one processor, the at least one script to a memory device.

16. The non-transitory computer-readable storage medium of claim 15; wherein the metadata comprises table metadata derived from the plurality of databases.

17. The non-transitory computer-readable storage medium of claim 15, wherein the first conflict handler and the second conflict handler are generated based on the target and source properties.

18. The non-transitory computer-readable storage medium of claim 15, wherein the rendering canvas includes at least one of a graphical view, a grid view, a text view, or a tree view.

19. The non-transitory computer-readable storage medium of claim 15, wherein a subset of the plurality of databases is displayed in the rendering canvas.

20. The non-transitory computer-readable storage medium of claim 15, wherein the at least one user-identified modification comprises at least one of:

adding a table;

modifying existing configurations of the plurality of databases;

linking a first table of the first database of the plurality of databases to a second table of the second database of the plurality of databases;

adding a rule; or modifying a rule.

21. The non-transitory computer-readable storage medium of claim 15, wherein the plurality of databases is in active-active or active-passive configuration.

* * * * *

UNITED STATES PATENT AND TRADEMARK OFFICE
CERTIFICATE OF CORRECTION

PATENT NO.         : 9,679,037 B2                                           Page 1 of 1
APPLICATION NO.    : 13/959792
DATED              : June 13, 2017
INVENTOR(S)        : Velmurugan Srinivasan It is certified that error appears in the above-identified patent and that said Letters Patent is hereby corrected as shown below:

In the Claims

Claim 8, Column 16, Line 53, "at east" should read --at least--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*